United States Patent
Agrawal et al.

(10) Patent No.: US 7,974,602 B2
(45) Date of Patent: Jul. 5, 2011

(54) FRAUD DETECTION TECHNIQUES FOR WIRELESS NETWORK OPERATORS

(75) Inventors: Prathima Agrawal, New Providence, NJ (US); Nobuyasu Nakjima, Wayne, NJ (US); Yoshihiro Ohba, Cedar Knolls, NJ (US); Faramak Vakil, Bedminster, NJ (US)

(73) Assignees: Toshiba America Research Inc., Morristown, NJ (US); Telcordia Technologies, Inc., Morristown, NJ (US)

( * ) Notice: Subject to any disclaimer, the term of this patent is extended or adjusted under 35 U.S.C. 154(b) by 685 days.

(21) Appl. No.: 09/946,795

(22) Filed: Sep. 6, 2001

(65) Prior Publication Data
US 2003/0045270 A1  Mar. 6, 2003

(51) Int. Cl.
*H04M 1/66* (2006.01)
*H04M 1/68* (2006.01)
*H04M 3/16* (2006.01)

(52) U.S. Cl. ......... 455/410; 455/403; 455/411; 709/229
(58) Field of Classification Search .......... 455/403, 455/410, 411; 709/229
See application file for complete search history.

(56) References Cited

U.S. PATENT DOCUMENTS

| | | | |
|---|---|---|---|
| 5,844,522 A * | 12/1998 | Sheffer et al. | 342/457 |
| 6,505,049 B1 * | 1/2003 | Dorenbosch | 455/456.2 |
| 6,594,481 B1 * | 7/2003 | Johnson et al. | 455/410 |
| 6,779,119 B1 * | 8/2004 | Moshfeghi et al. | 726/23 |
| 2002/0023215 A1 * | 2/2002 | Wang et al. | 713/171 |
| 2002/0135510 A1 * | 9/2002 | Bruno et al. | 701/213 |

* cited by examiner

*Primary Examiner* — Patrick N Edouard
*Assistant Examiner* — Matthew W Genack
(74) *Attorney, Agent, or Firm* — Banner & Witcoff, Ltd.

(57) ABSTRACT

A system and method are provided by which a network operator is able to detect fraudulent use of a subscriber's terminal, regardless of whether or not the subscriber is aware of the fraudulent use of her terminal. Detecting unauthorized terminal use in a wireless network includes recording a history of terminal location and registration patterns, analyzing the recorded history of location and registration patterns of the terminal, monitoring current location and registration patterns of the terminal, and requesting clarification when a deviation between said statistical analysis of the location and registration patterns of said terminal and said current location and registration patterns of said terminal is detected.

26 Claims, 2 Drawing Sheets

FRAUD DETECTION TECHNIQUES FOR WIRELESS NETWORK OPERATORS

BACKGROUND OF THE INVENTION

This present invention relates to wireless networks. More particularly, the invention relates to detecting fraud in the use of wireless network services.

As the use of mobile wireless terminals in wireless networks increases, a serious challenge confronting wireless network service providers is reducing, and even eliminating, fraudulent access of intruders and imposters to wireless network services as well as their unauthorized use of the wireless network services. Fraudulent access to network services may occur as a result of theft and subsequent illegal use of one of the following: i) a mobile wireless terminal (which will be referred to as a "terminal" henceforth) that belongs to an authorized subscriber of their respective wireless network services, ii) a subscriber's user identification module (UIM), which may be a detachable security device without which a terminal may not be activated or connected to a network, or iii) a subscriber's security association (SA), which is an index to the abstraction of the details of the subscriber security scheme that may be placed in packets transferring a subscriber's data across the network. Such fraudulent access to network services may result in the loss of significant revenue for wireless network service providers as well as financial loss and personal inconvenience for individual users who are the victims of such fraud.

Currently, a subscriber who no longer has her terminal or UIM in her possession, as a result of, for example, theft, accident or even carelessness, may simply report the loss of the terminal or UIM to the wireless network service provider to which she subscribes, and then wireless network service provider may revoke or even terminate terminal access to the wireless network or inhibit registration or connection to the wireless network by the UIM to avoid inadvertent or fraudulent use of the wireless network services by someone other than the subscriber to the wireless network or appropriate user of the terminal. However, since the subscriber may be otherwise preoccupied, or even in view of the increasingly reduced size of terminals and the detachable nature of UIMs, the absence of a terminal or UIM from a subscriber's possession may not be noticed or detected until after a significant amount of fraudulent or otherwise unauthorized use of the terminal or UIM by an unauthorized user has occurred. Moreover, a subscriber may not be aware of the theft of her SA with the network through an intruder's electronic eavesdropping on the wireless channel. In such cases, the subscriber to the wireless network may be unaware that her terminal or UIM or SA has been used for fraudulent or otherwise inappropriate access to the wireless network services until she receives an invoice from the wireless network service provider that includes a detailed record of access to the wireless network services by her terminal or UIM, which may result in significant charges.

Thus, there is a need for a system and technique that protect wireless network service providers from the financial loss that result from the fraudulent or otherwise unauthorized access to and use of wireless network services, as well as protecting the subscribers of the mobile wireless network services from the financial loss and personal inconvenience that further result from such fraudulent or otherwise unauthorized use thereof.

SUMMARY OF THE INVENTION

The present invention provides a system by which a wireless network service provider, including the network operator, is able to detect fraudulent use of a mobile wireless terminal, a subscriber user's identification module (UIM) or a subscriber user's security association (SA) for accessing and using the wireless network services, regardless of whether or not the authorized subscriber is aware of such fraudulent use of her mobile wireless terminal, UIM or SA.

According to an aspect of the present invention, detecting unauthorized access to and unauthorized use of services in a wireless network includes recording a history of terminal location within the wireless network and dynamic monitoring of the terminal's registration patterns, analyzing the recorded history of location of the terminal within the wireless network, monitoring current location and registration patterns of the terminal within the wireless network, and requesting clarification when a deviation between said statistical analysis of the location and registration pattern of the terminal within the wireless network and the current location and registration pattern of said terminal within the wireless network is detected. The invention may be implemented in databases as well as control and transport entities of a network, either singularly or in combination with each other or further network entities.

BRIEF DESCRIPTION OF THE DRAWINGS

The scope of the present invention will be apparent from the following detailed description, when taken in conjunction with the accompanying drawings. The detailed description of example embodiments of the invention is provided as illustrations only, since changes and modifications within the spirit and scope of the invention will become apparent to those skilled in the art from this detailed description, in which.

DETAILED DESCRIPTION

In the following detailed description, example embodiments and values may be given, although the present invention is not limited thereto. Further, while example embodiments of the present invention will be described in conjunction with a method for detecting fraud in wireless networks as an example, practice of the present invention is not limited thereto.

Figure 1:
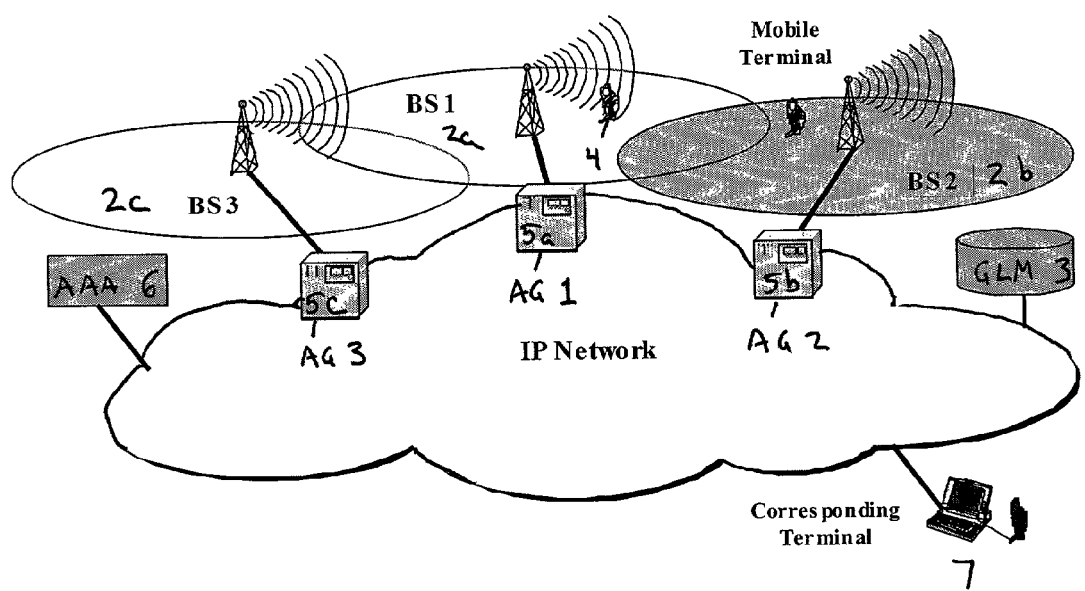
FIG. 1 shows an example of a wireless network in which the present invention may be utilized.

FIG. 1 shows an example of a wireless network in which the present invention may be utilized. The example wireless network of FIG. 1 may include a plurality of cells 2a, 2b and 2c that may provide a mobile terminal (hereinafter "terminal") that belongs to a subscriber of services provided by the wireless network service provider with access to the network infrastructure, which may include, but is not limited to, an Internet Protocol (IP) infrastructure. Each of base stations BS1, BS2 and BS3 may serve as a transmitting and receiving station for terminals in the respective cells 2a, 2b and 2c. The terminals may include, but are not limited to, telephones, pagers, laptop computers and other wireless transmitting and receiving systems. Therefore, based upon the services offered by the respective network service providers, the respective base stations BS1, BS2 and BS3 may or may not serve as an IP router, that is, the respective base stations may or may not have IP routing and processing capabilities.

Access gateways AG1, AG2 and AG3, which may be provided for the respective cells 2a, 2b and 2c, are edge IP routing and control entities that connect one or more of the base stations BS1, BS2 and BS3 to the network 1. However, beyond the example network of the present application, it is noted that an access gateway may actually connect several base stations to a network, and further, in no way is the present invention limited to a network having only three cells or even a one-to-one ratio of base stations to cells. Authentication, authorization and accounting (AAA) entity 6 is a network operator entity for network 1 that receives, processes and accepts or denies registration requests for the terminal. Thus, the AAA entity 6 is able to dynamically monitor the registration patterns of the terminals.

The network 1 may further include geographic location manager (GLM) 3 that is a control/management entity for network 1. GLM 3 may receive and store information pertaining to the geographic location of active or registered terminals. Such information pertaining to the geographic location of active or registered terminals may be gathered from satellite positioning systems including, but not limited to, the Global Positioning System (GPS), which is well known in the art of communications. For the present description, reference will be made to GPS, although the present invention is not limited to use of only GPS.

The GLM 3 may gather information regarding the geographic location of a terminal 4 in the network 1 to which the terminal is registered, and, based on the gathered information, the GLM may compute a probability density function, which is a normalized histogram, of the exact location of the active subscriber terminal 4. The histogram may be refined with each additional geographic location update of the subscriber terminal 4, which may occur, for example, every time the subscriber terminal 4 re-registers with the AAA 6 of network 1 as the subscriber terminal 4 moves from one cell to another, from cell 2a to 2b in FIG. 1, or at predetermined time intervals. The GLM 3 may provide normalized histograms regarding the geographic location of subscriber terminal 4 across network 1 to network control entities of the operator, which may include, but is not limited to, AAA 6 and the transport entities of the respective cells, which include, but are not limited to, AG1-AG3.

Figure 2:
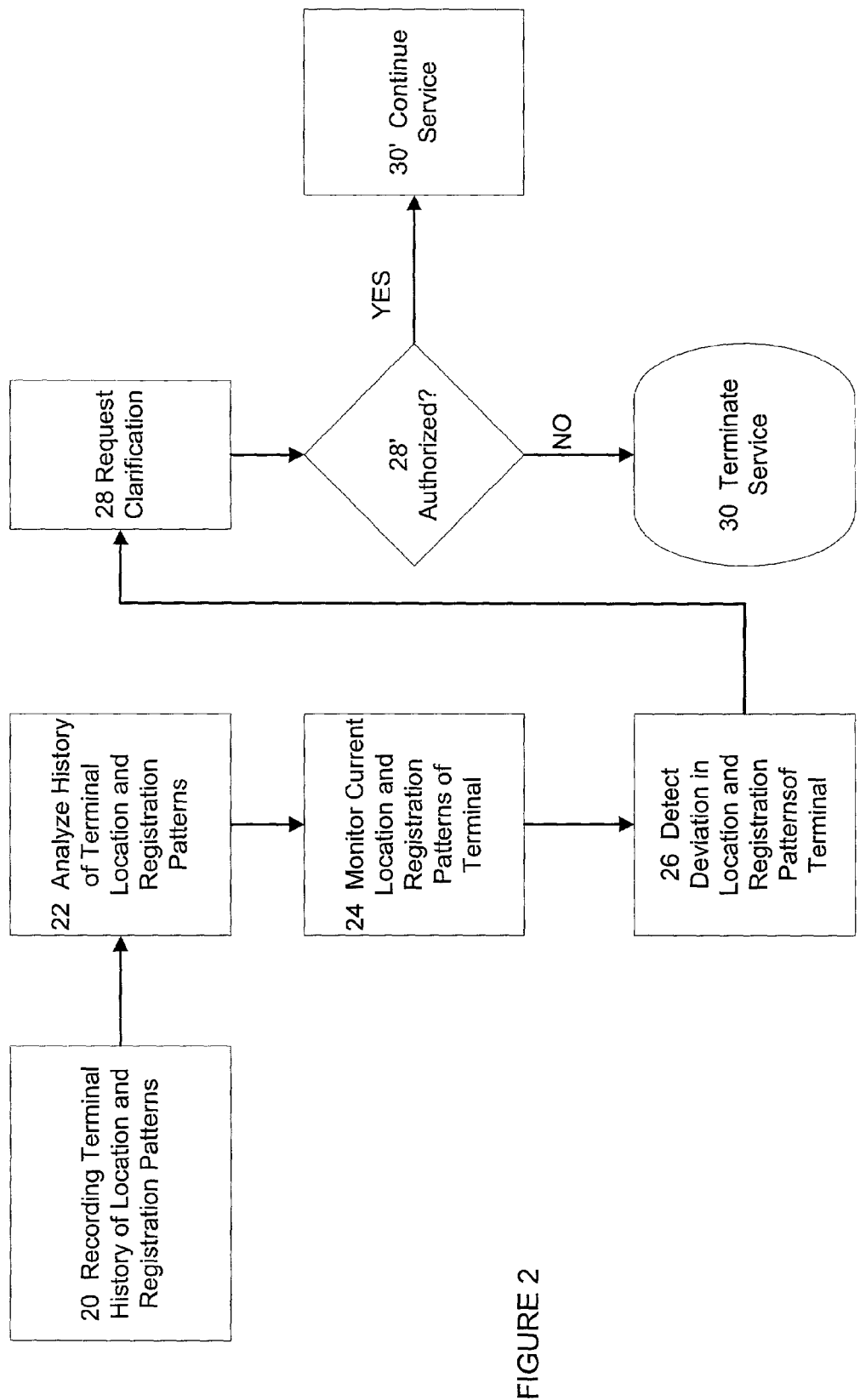
FIG. 2 is a flowchart showing an example of a method according to the present invention.

Explanation of an example embodiment of invention will now be further explained in reference to the flow chart of FIG. 2. The example embodiment further refers to FIG. 1 in which a registered terminal, which is subscribed to a particular network, moves among cells 2a through 2c in the network 1, although the present invention and application thereof is in no way limited thereto. In addition, the example embodiment of the invention may be implemented by a program run by the network entities described herein.

After subscription to the services offered by the network services provider associated with network 1, as terminal 4 moves from cell 2a to 2b, for example, terminal 4 may re-register its location with the network operator of the network 1 in order to maintain a connection to the network 1. GLM 3 may gather information from a positioning system to monitor all movements and corresponding locations of the terminal 4 within the network 1 and may further maintain such tracking information in a GLM database, as in step 20. With each recorded location of the terminal 4 within the network 1, or at predetermined time intervals, GLM 3 may update a normalized histogram as in step 22, which includes a probability distribution, of the exact location of the terminal 4. GLM 3 continues to monitor movements and corresponding locations of the terminal 4 in network 1, as in step 22, and with each recorded location of the terminal 4 within the network 1, or at predetermined time intervals, GLM 3 may update the histogram for terminal 4 locations. The AAA entity 6, or any other designated operator entity, may monitor the locations and registration patterns of terminal 4 by retrieving the exact location of terminal 4 as well as the probability distribution of locations of terminal 4 from GLM 3 upon receiving a registration request from terminal 4, as in step 24.

Thus, a normalized histogram for the behavior of terminal 4 within the network 1 may be established. The histograms may include information regarding the geographic locations and registration patterns of the terminal 4 in the network 1. When a deviation from any of the patterns provided in the histograms for terminal 4 has been detected, as in step 26, the network operator entities, including AAA 6 and AG1-AG3, may be alerted that terminal 4, or its associated UIM or SA, may not be currently used by the subscriber thereof. Then the network operator entity, including AAA 6 or any other entities, which are provided with the updated histogram for terminal 4, may prompt a clarification protocol to determine whether terminal 4 is being used fraudulently, as in step 28.

A deviation from an established pattern of use for terminal 4 may result from, as examples only, theft, accident or loss, which results in terminal 4, or its associated UIM or SA, being used by someone other than the authorized subscriber to the wireless network. Further, a deviation from an established pattern of use for terminal 4 may result from a clone or intruder illegally impersonating the terminal 4 or its UIM or SA by other unauthorized electronic means, thus impersonating an authorized network subscriber.

A further example of a deviation from an established pattern of use for terminal 4 may include frequent repetitive attempts by a terminal for registration or connection to a network 1 from the same location. Such case may include a subscriber making repeated, unsuccessful attempts at registering for the network services provided on the network 1, with such registration or connection attempts being denied, often because a clone of terminal 4, is already connected to the network 1. In such case, a network operator including AAA 6 or any of the network operator entities that are provided with the histograms to monitor the activities of terminal 4 on network 1 may prompt the clarification protocol after a threshold number of attempts at registration or connection for a terminal 4 to network 1 have been denied within a threshold amount of time.

Another example of a deviation from an established pattern of use for terminal 4 may include a network operator including AAA 6 or any other operator entities that monitor the network activity of terminal 4 on network 1 receiving a registration or connection request from terminal 4 from an unlikely geographic location which has not been previously recorded in the GLM database. Although a registration or connection request from a new geographic location does not necessarily indicate fraudulent use of terminal 4, the network operating entities may prompt the clarification protocol to thereby protect the authorized subscriber, as well as the wireless network service provider, from fraud.

Yet another example of a deviation from an established pattern of use for terminal 4 may include a network operator entity including AAA 6 or any other operator entities that monitor the network activity of terminal 4 on network 1 receiving registration or connection requests from a subscriber for terminal 4 that are inconsistent and therefore suspicious. For example, if the registration or connection requests come from different geographic locations within an improbable time frame, for instance registration or connection requests are made in New York, N.Y. and Washington, D.C. within five minutes of each other, the network operator entities may understand that such requests within such a short amount of time are physically impossible, and therefore the network operator entities may then prompt the clarification protocol.

A further example prompt for the clarification protocol may include an outside party contacting the network operator to report difficulty in contacting the subscriber user of terminal 4.

The clarification protocol, shown in clarification request step 28, which is intended to determine whether terminal 4 is being used fraudulently may include a step of terminating access to network 1 by terminal 4 or denying re-registration of terminal 4 as it moves from cell 2a to cell 2b, as in FIG. 1 for example. In the alternative, the clarification request step 28 may include a step of allowing re-registration of the terminal 4 within a new cell in the network 1 and then transmitting a query to the terminal 4 requesting verification that the current user of terminal 4 is the actual subscriber. The query may be an automated or operator-initiated text or audio message, depending on the capabilities of the terminal 4, which is transmitted before allowing further activity on the network 1 by the terminal 4. Such query may include a request for predetermined subscriber information or predetermined security information including, but not limited to, social security information, mother's maiden name, date of birth, etc. If the current user of the terminal 4 is not able to respond to the query in a satisfactory manner, all activities by terminal 4 on the network 1 may be terminated, as in step 30. At such point, the network operator may implement further security measures including, but not limited to, contacting the authorized subscriber using predetermined security protocols including alternative forms of communication, contacting appropriate law enforcement authorities and prohibiting all future network activity by terminal 4 until the authorized subscriber has contacted the network service provider and satisfactorily proven that the terminal 4 is being used by an authorized user. Otherwise, no fraudulent use is found, and service on network 1 may continue for terminal 4, as in step 30'.

This concludes the description of the example embodiments. Although the present invention has been described with reference to illustrative embodiments thereof, it should be understood that numerous other modifications and embodiments can be devised by those skilled in the art that will fall within the scope and spirit of the principles of the invention. More particularly, reasonable variations and modifications are possible in the component parts and/or arrangements of the subject combination arrangement within the scope of the foregoing disclosure, the drawings and the appended claims without department from the spirit of the invention. In addition to variations and modifications in the component parts and/or arrangements, alternative uses will also be apparent to those skilled in the art.

We claim:

1. A method of detecting unauthorized terminal use in a wireless network environment having a geographic location manager that receives positioning information regarding movement of a terminal, said method comprising:
    filtering received positioning information about locations of a terminal;
    performing a statistical analysis of the locations of said terminal;
    monitoring a current location of said terminal substantially in real-time; and
    requesting clarification from a user of said terminal upon detection of a deviation between said statistical analysis of the location of said terminal and said current location of said terminal,
    wherein said geographic location manager receives, filters, and performs a statistical analysis on the positioning information regarding said terminal in a database, and
    wherein the statistical analysis of the location of said terminal produces a normalized histogram of a location of said terminal and records said histogram in said database.

2. The method of claim 1, wherein a deviation between said normalized histogram and said current location of said terminal includes one of re-registration of said terminal at a location that is not included in the normalized histogram of the location of said terminal, re-registration of said terminal at a location that is not likely from a probability distribution of the usage of said terminal, and repeated denials of re-registration for said terminal.

3. The method of claim 2, wherein said monitoring of current location of said terminal is performed by a network control entity.

4. The method of claim 3, wherein said network control entity is at least one of an authentication, authorization, and accounting entity of said network.

5. The method of claim 4, wherein said requesting of clarification is performed by said network control entity.

6. The method of claim 5, wherein said requesting of clarification includes:
    sending a query to the user of said terminal;
    comparing the user's response to said query with user-security information stored in said database; and
    terminating registration of said terminal to said network and denying said further access to said network if said user's response to said query does not satisfy the user-security information stored in said database.

7. A system for detecting fraudulent use of network subscribing terminals in a wireless network environment having a geographic location manager that receives positioning information regarding the movement of a terminal, comprising:
    a database that derives and records a normalized histogram of a location of said terminal in a network; and
    a control entity that monitors a current location of said terminal substantially in real-time and requests clarification from a user of said terminal upon detection of a deviation between the normalized histogram of the location said terminal and the current location of said terminal.

8. The system of claim 7, wherein said database is included in said geographic location manager that receives positioning information regarding said terminal.

9. The system of claim 7, wherein a deviation between said normalized histogram of the location of said terminal and said current location of said terminal includes one of re-registration of said terminal at a location that is not included in the normalized histogram of the location of said terminal, re-registration of said terminal at a location that is not likely from a probability distribution of the usage of said terminal, and repeated denials of re-registration for said terminal.

10. The system of claim 9, wherein said control entity is an authentication, authorization, accounting entity of said network.

11. The system of claim 7, wherein, upon detection of the deviation between the normalized histogram of the location of said terminal and the current location of said terminal, said control entity sends a query to the user of said terminal, compares the user's response to said query with user-security information stored in said database, and terminates registration of said terminal to said network and denies further access to said network if said user's response to said query does not satisfy the user-security information stored in said database.

12. A non-transitory computer-readable medium having computer-executable instructions for detecting unauthorized terminal use of a terminal in a wireless network environment having a geographic location manager that receives positioning information regarding a movement of said terminal, said computer-executable instructions comprising:
   filtering the received information about locations of a terminal;
   performing a statistical analysis of the location of said terminal;
   monitoring a current location of said terminal substantially in real-time; and
   requesting clarification from a user of said terminal upon detection of a deviation between said statistical analysis of the location of said terminal and said current location of said terminal,
   wherein the statistical analysis of the location of said terminal produces a normalized histogram of a location of said terminal, and records said normalized histogram in a database.

13. The non-transitory computer-readable medium of claim 12, wherein said database is included in the geographic location manager that receives, filters, and performs a statistical analysis on positioning information regarding said terminal.

14. The non-transitory computer-readable medium of claim 12, wherein a deviation between said normalized histogram of the location of said terminal and said current location of said terminal includes one of re-registration of said terminal at a location that is not included in the normalized histogram of the location of said terminal, re-registration of said terminal at a location that is not likely from a probability distribution of the usage of said terminal, and repeated denials of re-registration for said terminal.

15. The non-transitory computer-readable medium of claim 14, wherein said monitoring of current location of said terminal is performed by a network operator.

16. The non-transitory computer-readable medium of claim 15, wherein said network operator is an authentication, authorization, accounting entity of said network.

17. The non-transitory computer-readable medium of claim 16, wherein said requesting of clarification is performed by said network operator.

18. The non-transitory computer-readable medium of claim 17, wherein said requesting of clarification includes:
   sending a query to the user of said terminal;
   comparing the user's response to said query with user-security information stored in said database; and
   terminating registration of said terminal to said network and denying further access to said network if said user's response to said query does not satisfy the user-security information stored in said database.

19. The method of claim 1, wherein said positioning information is satellite-based positioning information.

20. The system of claim 7, wherein said positioning information is satellite-based positioning information.

21. The non-transitory computer-readable medium of claim 12, wherein said positioning information is satellite-based positioning information.

22. A method of detecting unauthorized terminal use in a wireless network environment having a geographic location manager that receives positioning information regarding movement of a terminal, said method comprising:
   receiving previous positioning information about locations of a terminal;
   performing a statistical analysis of the previous locations of said terminal and producing a normalized histogram of the previous locations;
   receiving a current position of said terminal substantially in real-time; and
   challenging a user of said terminal upon detection of a deviation between said normalized histogram of said statistical analysis of the previous locations of said terminal and said current location of said terminal.

23. The method according to claim 22, wherein said current position of said terminal is received from said terminal when said terminal registers with said wireless network.

24. The method according to claim 22, wherein said positioning information is satellite-based positioning information from said terminal.

25. A system for detecting fraudulent use of network subscribing terminals in a wireless network environment having a geographic location manager that receives positioning information regarding the movement of a terminal, comprising:
   a database that derives and records a normalized histogram of a location of said terminal in a network; and
   a control entity that monitors a current location of said terminal substantially in real-time and challenges a user of said terminal upon detection of a deviation between the normalized histogram of the previous locations of said terminal and the current location of said terminal.

26. The system according to claim 25, wherein said positioning information is satellite-based positioning information from said terminal.

* * * * *

UNITED STATES PATENT AND TRADEMARK OFFICE
CERTIFICATE OF CORRECTION

PATENT NO. : 7,974,602 B2
APPLICATION NO. : 09/946795
DATED : July 5, 2011
INVENTOR(S) : Agrawal et al.

It is certified that error appears in the above-identified patent and that said Letters Patent is hereby corrected as shown below:

On the Title Page, Item (56), under "U.S. PATENT DOCUMENTS", in Column 2, Line 6, delete "701/213" and insert -- 342/357.1 --, therefor.

On the Title Page, Item (57), under "ABSTRACT", in Column 2, Line 4, delete "her terminal." and insert -- the terminal. --, therefor.

On the Title Page, in the Figure, in Box "26", in Line 5, delete "Patternsof" and insert -- Patterns of --, therefor.

In the Drawings

In Fig. 2, Sheet 2 of 2, in Box "26", in Line 5, delete "Patternsof" and insert -- Patterns of --, therefor.

In the Claims

In Column 6, Line 23, in Claim 5, delete "claim 4," and insert -- claim 3, --, therefor.

Signed and Sealed this
Fourth Day of November, 2014

Michelle K. Lee
*Deputy Director of the United States Patent and Trademark Office*